US011301180B2

(12) United States Patent
Saitoh

(10) Patent No.: US 11,301,180 B2
(45) Date of Patent: Apr. 12, 2022

(54) INFORMATION PROCESSING APPARATUS REGISTERING REDO OR ERRONEOUS PROCESS REQUEST

(71) Applicant: FUJIFILM Business Innovation Corp., Tokyo (JP)

(72) Inventor: Kazutaka Saitoh, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 314 days.

(21) Appl. No.: 16/205,201

(22) Filed: Nov. 29, 2018

(65) Prior Publication Data

US 2019/0278528 A1    Sep. 12, 2019

(30) Foreign Application Priority Data

Mar. 9, 2018    (JP) .............................. JP2018-043070

(51) Int. Cl.
*G06F 3/12* (2006.01)
(52) U.S. Cl.
CPC ............ *G06F 3/121* (2013.01); *G06F 3/1234* (2013.01); *G06F 3/1273* (2013.01); *G06F 3/1294* (2013.01)
(58) Field of Classification Search
None
See application file for complete search history.

(56) References Cited

U.S. PATENT DOCUMENTS

| 2011/0007338 | A1 | 1/2011 | Kawanishi | |
|---|---|---|---|---|
| 2011/0289504 | A1* | 11/2011 | Murasawa | G06F 9/5038 718/102 |
| 2012/0166906 | A1* | 6/2012 | Nagadomi | H03M 13/6561 714/755 |
| 2017/0066267 | A1* | 3/2017 | Regelsberger | B41J 2/2103 |
| 2020/0068090 | A1* | 2/2020 | Lee | H04N 1/32635 |

FOREIGN PATENT DOCUMENTS

| JP | 2006165613 | 6/2006 |
|---|---|---|
| JP | 2011010038 | 1/2011 |
| JP | 2011018978 | 1/2011 |
| JP | 2013190839 | 9/2013 |
| JP | 2013247432 | 12/2013 |
| JP | 2016173662 | 9/2016 |

OTHER PUBLICATIONS

Office Action of Japan Counterpart Application, with English translation thereof, dated Nov. 30, 2021, pp. 1-13.

* cited by examiner

*Primary Examiner* — Dov Popovici
(74) *Attorney, Agent, or Firm* — JCIPRNET

(57) ABSTRACT

An information processing apparatus includes a process request history registration unit that registers at least one of information, which indicates that a current process request is a redo process request, or information, which indicates that a past process request pertaining to a target document is an erroneous process request, in process request history in a case where a process setting for the past process request pertaining to the target document, which is a past document identical or similar to a current document that is a target of the current process request, included in the process request history including the process setting for the past process request and information which indicates the past document that is a target of the past process request, is different from a process setting for the current process request.

20 Claims, 11 Drawing Sheets

FIG. 3

| | HUMAN ERROR INFORMATION | ERROR CAUSE | JOB TYPE | RESULT | COMPLETION TIME | NUMBER OF OUTPUT PAPER SHEETS | USER ID | NAME | ... | BOTH SIDES | N UP | ... |
|---|---|---|---|---|---|---|---|---|---|---|---|---|
| 50c → | | | PRINT | SUCCESSFUL COMPLETION | 10/11/2017 10:00 | 1 | FX12345 | ABC APPROVAL REQUEST IN 2017 | ... | ... | ... | ... |
| 50d → | HUMAN ERROR | IMAGE DATA | PRINT | SUCCESSFUL COMPLETION | 10/12/2017 10:00 | 2 | FX12345 | ABC ORDER DOCUMENT IN 2017 | ... | ... | ... | ... |
| 50e → | ~~REDO~~ HUMAN ERROR | IMAGE DATA | PRINT | SUCCESSFUL COMPLETION | 10/12/2017 10:15 | 1 | FX12345 | ABC ORDER DOCUMENT IN 2017 | ... | ... | ... | ... |
| 50f → | HUMAN ERROR | IMAGE DATA | SCAN | SUCCESSFUL COMPLETION | 10/12/2017 10:16 | 2 | FX12345 | ABC ORDER DOCUMENT IN 2017 | ... | ... | ... | ... |
| 50g → | REDO | | PRINT | SUCCESSFUL COMPLETION | 10/13/2017 10:17 | 1 | FX12345 | ABC ORDER DOCUMENT IN 2017 | ... | ... | ... | ... |
| 50h → | REDO | | SCAN | SUCCESSFUL COMPLETION | 10/13/2017 10:18 | 2 | FX12345 | ABC ORDER DOCUMENT IN 2017 | ... | ... | ... | ... |

FIG. 4

| | JANUARY, 2017 | FEBRUARY, 2017 | MARCH, 2017 | APRIL, 2017 | MAY, 2017 | ... |
|---|---|---|---|---|---|---|
| NUMBER OF TIMES OF OCCURRENCES (SCAN) | 2 | 3 | 7 | 10 | 9 | ... |
| JOB PARAMETER | 1 | 1 | 3 | 6 | 5 | ... |
| IMAGE DATA | 1 | 2 | 4 | 4 | 4 | ... |
| NUMBER OF TIMES OF OCCURRENCES (PRINT) | 30 | 30 | 35 | 50 | 45 | ... |
| JOB PARAMETER | 28 | 25 | 30 | 42 | 44 | ... |
| IMAGE DATA | 2 | 5 | 5 | 8 | 1 | ... |
| NUMBER OF WASTEFUL OUTPUT PAPER SHEETS | 300 | 500 | 400 | 700 | 600 | ... |

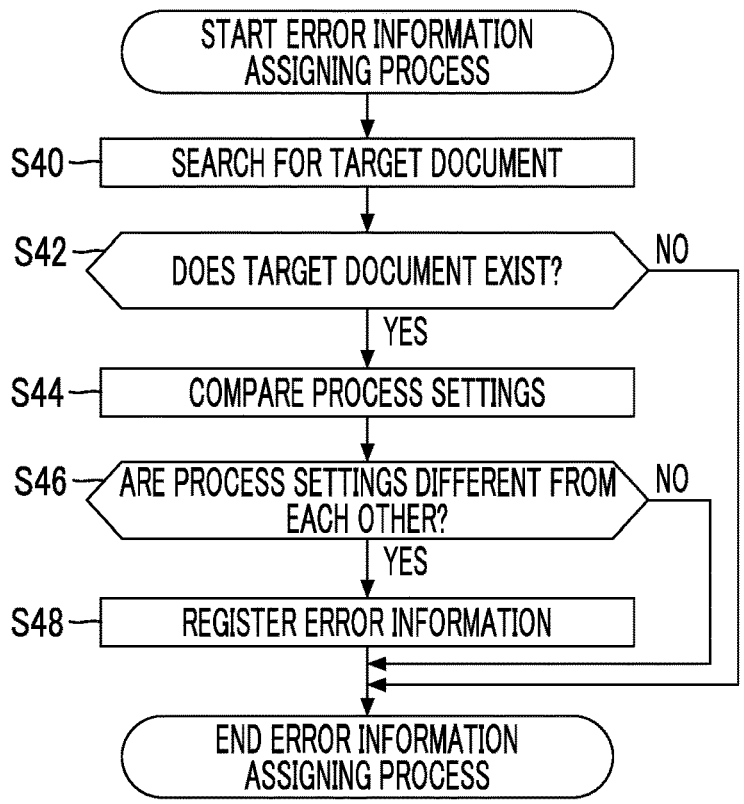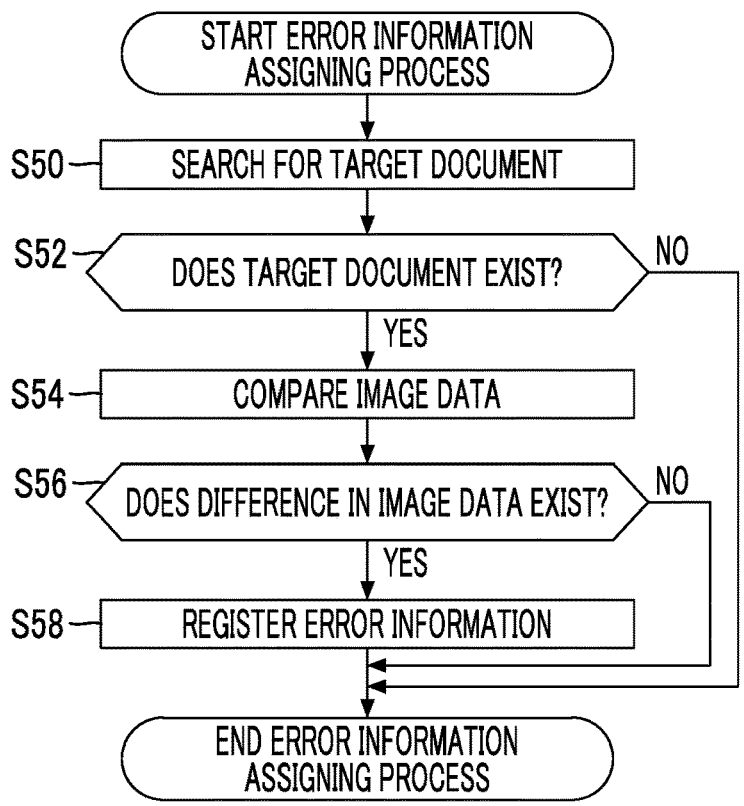

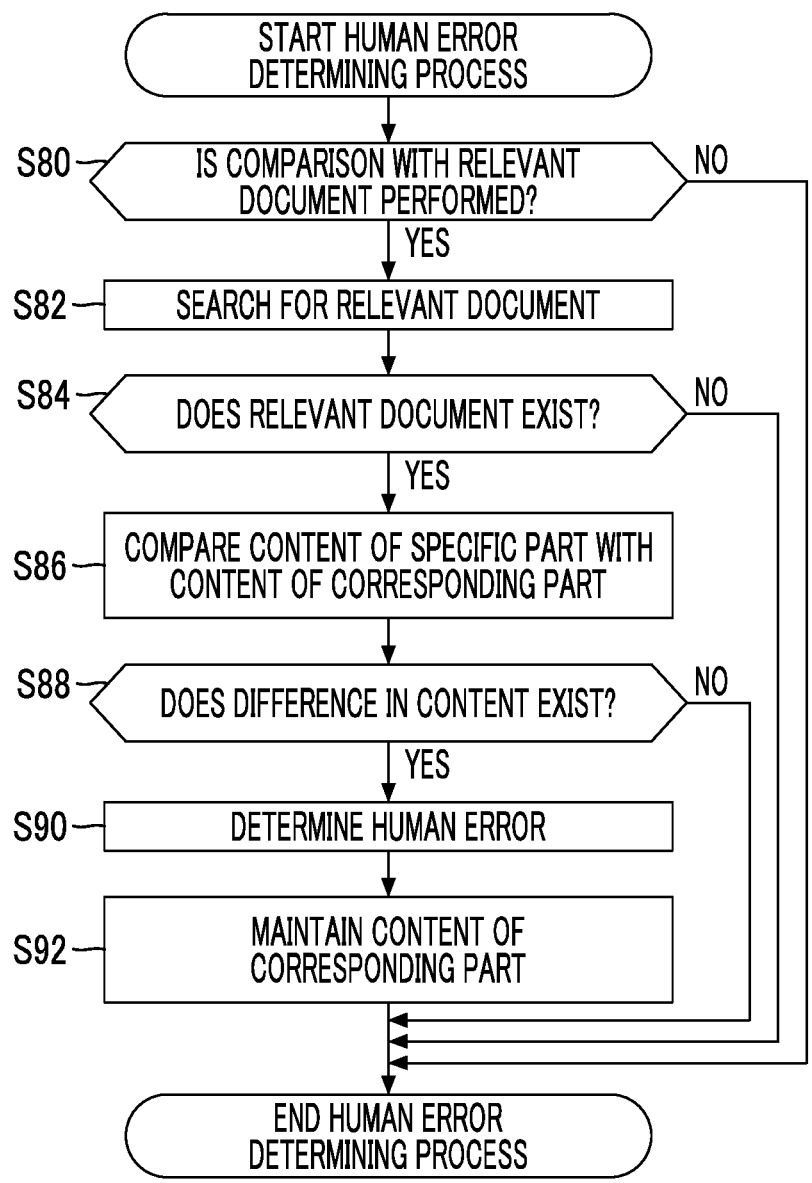

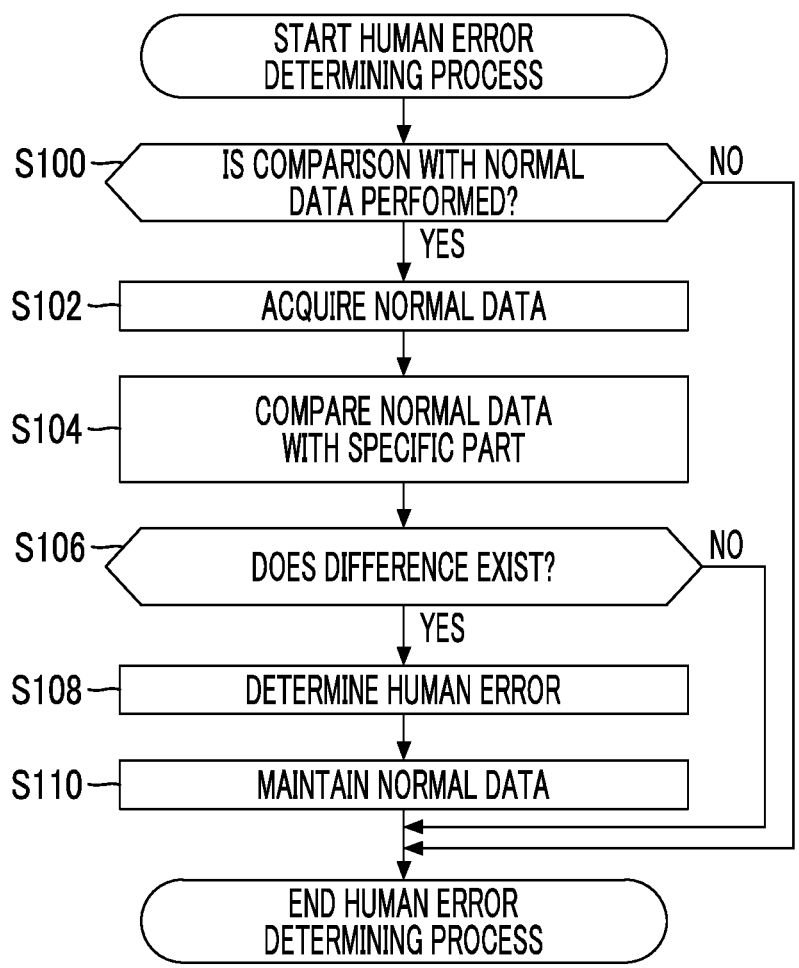

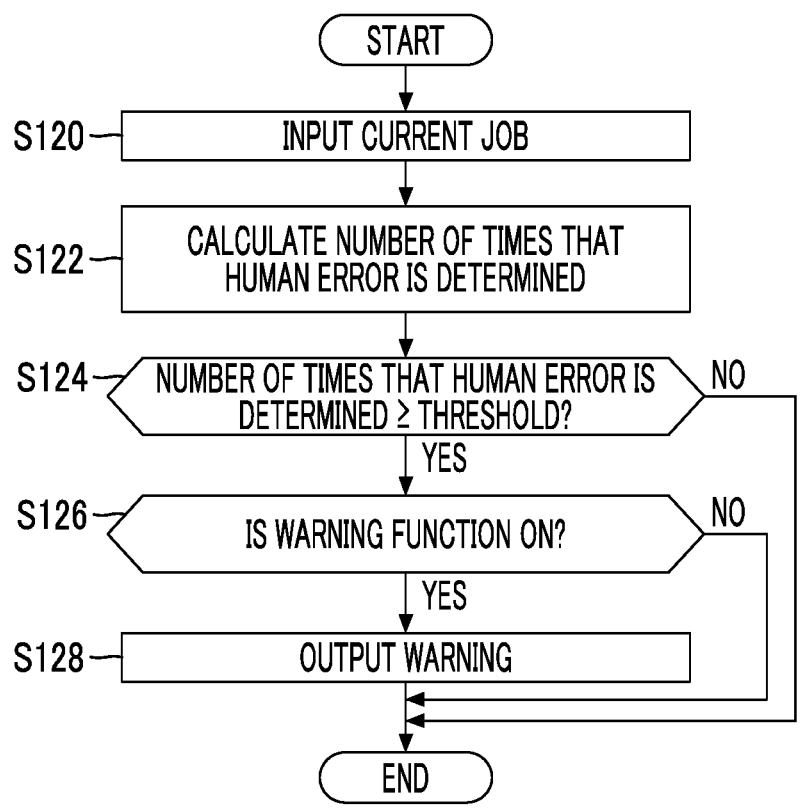

INFORMATION PROCESSING APPARATUS REGISTERING REDO OR ERRONEOUS PROCESS REQUEST

CROSS-REFERENCE TO RELATED APPLICATIONS

This application is based on and claims priority under 35 USC 119 from Japanese Patent Application No. 2018-043070 filed Mar. 9, 2018.

BACKGROUND

(i) Technical Field

The present invention relates to an information processing apparatus.

(ii) Related Art

In a case where a user processes a document using an information processing apparatus, there is a case where a processing result which is desired for the user is not acquired due to a mistake (human error) of the user. In the related art, a technology is proposed for correcting a processed document in a case where the processing result, which is desired for the user, is not acquired in relation to the document processed using the information processing apparatus.

For example, JP2006-165613A discloses a multifunction printer that performs an Optical Character Recognition (OCR) process on a part, which is filled with a marker having a specific color, of processed output paper, and that enables a user to correct text extracted through the OCR process.

In addition, JP2011-10038A discloses an image forming apparatus which previews image data to be FAX transmitted, outputs a FAX manuscript by emptying an erroneous spot in a case where a user finds an error in image data, allows the user to write a correct value at an empty part, and transmits the image data acquired by scanning the FAX manuscript into which the value is written.

In contrast, a technology is disclosed for detecting the human error of the user in a case where a specific work flow is not determined.

For example, JP2016-173662A discloses a system which detects a human error of a user in a work flow of requesting a manager for admissibility to an approval, receiving permission, printing out an application, getting a seal of the manager on the application, scanning the sealed application, and preserving the sealed application as image data. Specifically, a work flow server receives an application before being sealed, and generates assumption image data (corresponding to an application which is sealed) that is assumed to be scanned by the user based on the application before being sealed. Furthermore, in a case where the application (which is supposed to be sealed) is actually scanned by the user, the image data acquired through the scan and the assumption image data are compared. In a case where a difference exists, a gist thereof is notified to the user.

SUMMARY

However, even in a case other than a process in a specific work flow, it is desired to grasp occurrence of a human error in an information processing apparatus used to process a document by a user.

Aspects of non-limiting embodiments of the present disclosure relate to an information processing apparatus that enables the occurrence of the human error relevant to the process of the document to be grasped even in the case other than the process in the specific work flow.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including: a process request history registration unit that registers at least one of information, which indicates that a current process request is a redo process request, or information, which indicates that a past process request pertaining to a target document is an erroneous process request, in process request history in a case where a process setting for the past process request pertaining to the target document, which is a past document identical or similar to a current document that is a target of the current process request, included in the process request history including the process setting for the past process request and information which indicates the past document that is a target of the past process request, is different from a process setting for the current process request.

BRIEF DESCRIPTION OF THE DRAWINGS

Exemplary embodiment(s) of the present invention will be described in detail based on the following figures, wherein:

FIG. 3 is a conceptual diagram illustrating another example of the content of the job history DB;

FIG. 4 is a diagram illustrating a first example of statistical data;

FIG. 8 is a first flowchart illustrating a flow of an error information assigning process;

FIG. 9 is a second flowchart illustrating the flow of the error information assigning process;

FIG. 11 is a second flowchart illustrating the flow of the human error determining process;

FIG. 12 is a third flowchart illustrating the flow of the human error determining process; and FIG. 13 is a flowchart illustrating a flow of a process for outputting a warning according to the number of times that the human error is determined.

DETAILED DESCRIPTION

Hereinafter, an exemplary embodiment of the present invention will be described.

Figure 1:
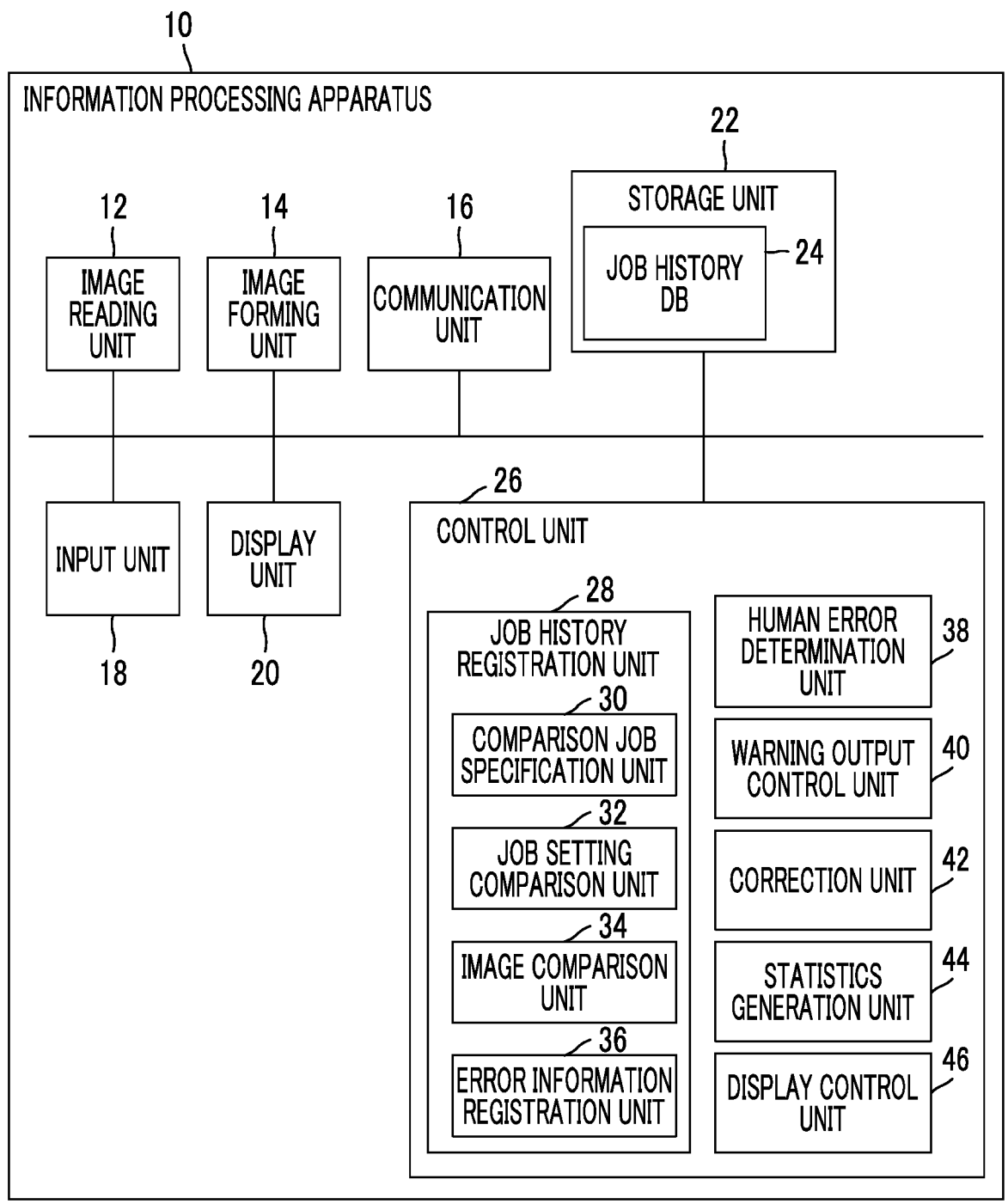
FIG. 1 is a schematic diagram illustrating a configuration of an information processing apparatus according to an exemplary embodiment.

FIG. 1 is a schematic diagram illustrating a configuration of an information processing apparatus 10 according to the exemplary embodiment. In the exemplary embodiment, the information processing apparatus 10 is a Multi Function Printer (MFP) which has a printing function, a scanning function, a copy function, a fax function, a mail transmission function, a cloud server transmission function, and the like. The information processing apparatus 10 certifies the user, receives a process request (job) from the user, and performs a process according to the job.

An image reading unit 12 includes a Charge-Coupled Device (CCD) image sensor or the like. The image reading unit 12 acquires image data by performing a reading process for reading an image on a manuscript, such as paper, which is set on a manuscript stand (not illustrated in the drawing) of the information processing apparatus 10.

An image forming unit 14 includes a processing unit that performs a print process for representing the image data, which is a target of a job, on a print medium such as paper.

A communication unit 16 includes a network adapter or the like. The communication unit 16 is a so-called communication interface, and transmits and receives data between the information processing apparatus 10 and another apparatus through a communication line such as a LAN or the Internet. The information processing apparatus 10 is capable of receiving a job from another apparatus (for example, a user terminal used by the user) using the communication unit 16. In addition, the information processing apparatus 10 is capable of transmitting the image data, which is the target of the job, to another apparatus (for example, a server, a FAX receiver, or the like) using the communication unit 16.

An input unit 18 includes a touch panel or buttons. The input unit 18 is provided for the user to input a command with respect to the information processing apparatus 10.

A display unit 20 includes, for example, a liquid crystal panel. Various operation screens of the information processing apparatus 10 or various pieces of information presented to the user are displayed on the display unit 20.

A storage unit 22 includes a hard disk, a ROM, a RAM, or the like. The storage unit 22 stores an information processing program used to operate each of the units of the information processing apparatus 10. In addition, as illustrated in FIG. 1, the storage unit 22 stores a job history Database (DB) 24.

The job history DB 24 is a database in which a job history is registered as a process request history that is a history of jobs (hereinafter, referred to as "past jobs") processed in the past by the information processing apparatus 10. Whenever the information processing apparatus 10 completes a process of a job, the job history, which is information relevant to the processed job, is accumulated and registered in the job history DB 24.

Figure 2:
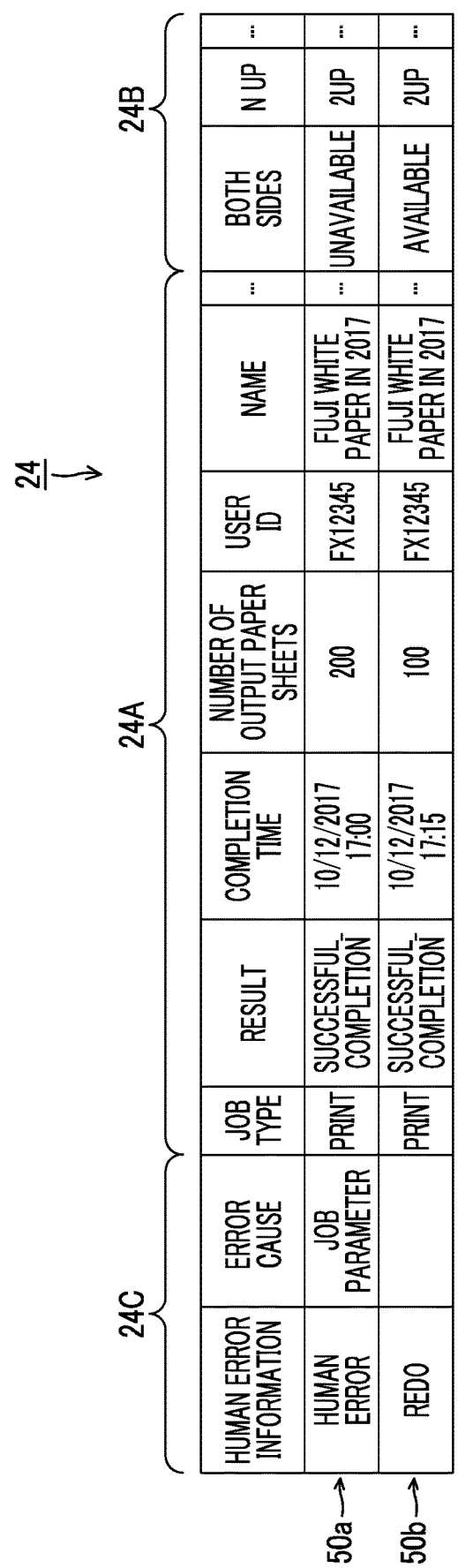
FIG. 2 is a conceptual diagram illustrating an example of content of a job history DB.

FIG. 2 illustrates an example of content of the job history DB 24. In FIG. 2, the job history DB 24 is illustrated as a table format, and each record corresponds to each job history. As illustrated in FIG. 2, the job history according to the exemplary embodiment includes job attribute information 24A, job setting information 24B, and error information 24C.

The job attribute information 24A is information indicative of an attribute of a past job. As illustrated in FIG. 2, the attribute included in the job attribute information 24A includes a job type, a processing result, completion time, the number of output pages, a user ID used to identify the user who inputs the past job, a name (for example, a file name of an electronic document) of a past document as information indicative of the past document which is a target of the past job (process), and the like. Here, the job type is information indicative of content of a process instructed by the user using the past job, and includes, for example, print, copy, scan, mail transmission, fax transmission, and the like. In addition, the user logs in (certified by) the information processing apparatus 10 before inputting a job with respect to the information processing apparatus 10. Therefore, the information processing apparatus 10 is capable of acquiring a user ID of the user who inputs the job based on login information. Meanwhile, attributes other than the above-described attributes may be included as the attribute included in the job attribute information 24A.

The job setting information 24B is information indicative of a process setting for the past job, which is set by the user who inputs the past job, in a case where the past job is input. For example, setting of double-sided/one-sided print, N-UP setting, and the like are included. It is apparent that other settings, such as a color mode and a paper size, may be included as the process settings included in the job setting information 24B. The process settings included in the job setting information 24B may differ according to the job type.

The error information 24C will be described in detail later.

In addition, although not illustrated in FIG. 2, the image data pertaining to each past job may be registered in the job history DB 24. For example, in a case where the job type of the past job is print or the like, the image data pertaining to each past job may be image data of the past document (electronic document) relevant to the past job. Otherwise, the image data pertaining to each past job may be a bitmap image generated through an RIP process performed with respect to the past document relevant to the past job. In addition, in a case where the job type of the past job is copy, scan, or the like, the image data pertaining to each past job may be image data acquired in such a way that the document is read by the image reading unit 12.

Returning to FIG. 1, a control unit 26 includes a CPU or a microcontroller. The control unit 26 controls an operation of each of the units of the information processing apparatus 10 according to the information processing program stored in the storage unit 22. In addition, as illustrated in FIG. 1, the control unit 26 functions as a job history registration unit 28. The job history registration unit 28 includes a comparison job specification unit 30, a job setting comparison unit 32, an image comparison unit 34, and an error information registration unit 36. Furthermore, the control unit 26 functions as a human error determination unit 38, a warning output control unit 40, a correction unit 42, a statistics generation unit 44, and a display control unit 46.

The job history registration unit 28 performs a process for registering the job history relevant to the job which is input by the user in the job history DB 24. The job history registration unit 28 registers the error information 24C in addition to the job attribute information 24A and the job setting information 24B. Specifically, the job history registration unit 28 determines whether or not a job (hereinafter, referred to as "current job") which is newly input by the user is a redo-job attributable to a mistake (human error) of the user, and registers the error information 24C based on the determination. Hereinafter, a process of each of the units included in the job history registration unit 28 and a process for registering the error information 24C will be described in detail.

The comparison job specification unit 30 specifies a past job, which is a comparison target with the current job, among a plurality of past jobs included in the job history DB 24 in order to determine whether or not the current job is the redo-job.

In the exemplary embodiment, the comparison job specification unit 30 specifies a past document (in the specification, referred to as a "target document"), which is identical or similar to a current document that is a target of the current job, among a plurality of past documents which are targets of the plurality of past jobs stored in the job history DB 24. Furthermore, the comparison job specification unit 30 specifies the past job relevant to the specified target document as a comparison target of the current job.

As a method for determining similarity between the past document and the current document, determination is possible based on, for example, the file name of the document, the user ID of the user who inputs a job relevant to the document, and a job type of the job relevant to the document. For example, in a case where the user ID of the user who inputs the current job relevant to the document is identical to a user ID of a user who inputs the past job, the job type of the current job is identical to a job type of the past job, and the file name of the current document is identical to a file name of the past document, the comparison job specification unit 30 is capable of determining that the past document is identical to the current document. In addition, in a case where the user ID of the user who inputs the current job is identical to the user ID of the user who inputs the past job, the job type of the current job is identical to the job type of the past job, and the file name of the current document is similar to the file name of the past document, the comparison job specification unit 30 is capable of determining that the past document is similar to the current document. Meanwhile, a file name of a document, which is a target of a scan job, may be designated by the user in a case where the scan job is input.

Here, in a case where filename similarity is determined, it is apparent that, in a case where file names are completely identical, it is determined that the file names of both documents are identical. In addition, in a case where the file names of parts, other than a symbol or a number (for example, a number which indicates a version or a date), are identical to each other in both the file names, it maybe determined that both the file names are similar.

Otherwise, the comparison job specification unit 30 may determine the similarity between the past document and the current document by comparing images of image data of the current document and the image data of the past document. For example, the comparison job specification unit 30 may calculate a degree of similarity between both the image data by performing comparison on a pixel value for each pixel between the image data of the current document and the image data of the past document, and may determine that both the documents are similar in a case where the calculated degree of similarity is equal to or larger than a threshold.

Furthermore, preferably, for example, the comparison job specification unit 30 may specify the past job, which is the comparison target of the current job, among the past jobs whose processes are completed within past predetermined time from current job input time. As described above, since past job completion time is registered in the job history DB 24, the comparison job specification unit 30 specifies the past documents which are identical or similar to the current documents by narrowing to past jobs having completion time within the predetermined time from the current job input time.

The job setting comparison unit 32 compares a process setting for the past job relevant to the target document specified by the comparison job specification unit 30 with a process setting for the current job, and determines whether or not both the process settings are different from each other.

For example, in a case where a process setting for the target document includes "both sides: unavailable" and the process setting for the current job includes "both sides: available", the job setting comparison unit 32 determines that the process setting for the past job relevant to the target document is different from the process setting for the current job. In a case where it is apparent that the process setting for the current job is identical to the process setting for the past job relevant to the target document, the job setting comparison unit 32 determines that the process setting for the past job relevant to the target document is identical to the process setting for the current job.

In a case where an identical user targets identical or similar documents and inputs two jobs, in which the job types are identical and the process settings are different from each other, it is possible to assume a case where a human error (here, referred to as a user's process setting mistake) occurs in a previously input job and a subsequent job is input after correcting the process setting. In a case where the input times of the two jobs is close (that is, the past job completion time and the current job input time are within the predetermined time), it may be said that such a possibility further increases.

Therefore, in a case where the process setting for the past job relevant to the target document is different from the process setting for the current job, the job setting comparison unit 32 specifies the past job relevant to the target document as an erroneous job in which the human error occurs, and specifies the current job as a redo-job resulting from the human error. The redo-job is a job which is necessary to be reluctantly input because the human error occurs, that is, a job which is not necessary to be input in a case where the human error does not occur.

The image comparison unit 34 compares the image data pertaining to the past job (the past job relevant to the target document) specified by the comparison job specification unit 30 with image data pertaining to the current job, and determines whether or not difference exists between both the image data. As described above, in a case where the target document or the current document is an electronic document, the image data may be the electronic document itself or may be the image data which is generated in processing the job. As a method for comparing the image data, it is possible to use an existing method. For example, it is possible to determine whether or not a difference exists between both the image data by performing comparison on the pixel value for each pixel between the image data pertaining to the current job and the image data pertaining to the past document.

In a case where an identical user targets similar documents and inputs two jobs, which have identical job types and in which difference exists between the image data, it is possible to consider that a human error (here, a mistake relevant to content of the document) occurs in a previously input job and a subsequent job is input after correcting the document. For example, a case may be considered where a scan job relevant to an application is input while forgetting sealing on the application, which originally needs to be sealed, and, thereafter, the scan job is input again after realizing the forgetting of the sealing and getting the sealing.

Therefore, in a case where difference exists between the image data pertaining to the past job specified by the comparison job specification unit 30 and the image data pertaining to the current job, the image comparison unit 34 specifies the past job (that is, the past job relevant to the target document) as an erroneous job in which the human error occurs, and specifies the current job as the redo-job resulting from the human error.

As described above, the job setting comparison unit 32 or the image comparison unit 34 determine whether or not the current job is the redo-job and determine the past job registered in the job history DB 24 is an erroneous job. In the job history registration unit 28, it is possible to perform two determination methods, that is, a determination method through the process performed by the job setting comparison unit 32 and a determination method through the process performed by the image comparison unit 34. However, determination may be performed using either of the methods, and both the determination methods may be sequentially performed.

The error information registration unit 36 performs a process for registering the error information 24C (refer to FIG. 2) in the job history DB 24 based on a result of determination performed by at least any one of the job setting comparison unit 32 or the image comparison unit 34. As illustrated in FIG. 2, the error information 24C in the exemplary embodiment includes human error information and information indicative of an error cause. The human error information is information which indicates whether the job is the erroneous job or the redo-job. In addition, the error cause is registered with respect to the erroneous job and indicates a cause of the erroneous job.

The error information registration unit 36 registers a "human error", which indicates that the job is the erroneous job, as the human error information of the past job which is determined to be the erroneous job by at least any one of the job setting comparison unit 32 or the image comparison unit 34. In addition, as the error cause of history of the past job, a cause of the erroneous job is registered. Specifically, in a case where it is determined to be the erroneous job through the determination of the job setting comparison unit 32, a "job parameter", which indicates a mistake of the process setting, is registered as the error cause. In a case where it is determined to be the erroneous job through the determination of the image comparison unit 34, "image data" which indicates a mistake relevant to the content of the document is registered as the error cause.

In addition, the error information registration unit 36 registers "redo", which indicates that the job is a redo job, as the human error information of a history of the current job which is determined as the redo-job by at least any one of the job setting comparison unit 32 or the image comparison unit 34.

The error information registration unit 36 registers a redo-job (a job 50b in the example of FIG. 2) and an erroneous job (a job 50a in the example of FIG. 2), which is a cause that the redo-job is input, in the job history DB 24 in association with each other. Therefore, even in a case where a plurality of redo-jobs and a plurality of erroneous jobs are registered in the job history DB 24, it is possible to specify the erroneous job which is the cause of the redo-job.

Meanwhile, in the exemplary embodiment, the error information registration unit 36 registers the error information 24C for both the erroneous job and the redo-job in the job history DB 24. However, the error information 24C for any one of the erroneous job and the redo-job may be registered in the job history DB 24. In a case where the error information 24C for any one of the erroneous job and the redo-job is registered, it is possible to grasp at least a fact that the human error occurs with reference to the job history DB 24.

FIG. 2 illustrates an example of content of the job history DB 24 in a case where a user indicated by a user ID "FX12345" inputs the job 50a with a process setting including "both sides: unavailable" for an electronic document "Fuji white paper in 2017" and, thereafter, the identical user inputs the job 50b with the process setting including "both sides: available" for the identical electronic document. In this case, in a case where the job 50b is input, a past document, which is a target of the job 50a registered in the job history DB 24 by the comparison job specification unit 30, is specified as the target document. Thereafter, the job 50a is determined to be the erroneous job through comparison, which is performed by the job setting comparison unit 32, between the process settings of the job 50a and the job 50b, and the job 50b is determined to be the redo-job.

In addition, FIG. 3 illustrates another example of the job history DB 24. In the example of FIG. 3, the user indicated by the user ID "FX12345" inputs a job 50c for printing an electronic document "ABC approval request in 2017", and, thereafter, the identical user inputs a job 50d for printing an electronic document "ABC order document in 2017". Furthermore, a mistake, such as a price error, is detected in the printed order document, and the identical user inputs a job 50e for printing the corrected electronic document "ABC order document in 2017". Thereafter, in order to transmit the order document an ordering destination, a job 50f for scanning the document is input after the order document, which is printed through the job 50e, is sealed. Furthermore, thereafter, since an error of the order document is pointed out from the ordering destination, the identical user further corrects the electronic document "ABC order document in 2017", inputs a job 50g for printing the corrected order document, seals the printed order document, and inputs a job 50h for scanning the document.

In the example of FIG. 3, in a case where the job 50e is input, the past document "ABC order document in 2017", which is a target of the job 50d registered in the job history DB 24 by the comparison job specification unit 30, is specified as the target document, and the job 50d is determined to be the erroneous job and the job 50e is determined to be the redo-job based on a difference between mistake correction spots through comparison, which is performed by the image comparison unit 34, between image data pertaining to the job 50d and image data pertaining to the job 50e. Thereafter, in a case where the job 50g, which is the print job, is input, the past document "ABC order document in 2017", which is the target of the job 50e registered in the job history DB 24, is specified as the target document by the comparison job specification unit 30. Thereafter, comparison is performed by the image comparison unit 34 between the image data pertaining to the job 50e and the image data pertaining to the job 50g which is the identical print job. Since a difference exists in error correction spot which is pointed out from the ordering destination, the job 50e is overwritten as an erroneous job and the job 50g is determined to be the redo-job. In addition, in a case where the job 50h, which is the scan job, is input, the past document "ABC order document in 2017", which is a target of the job 50f registered in the job history DB 24 by the comparison job specification unit 30, is specified as the target document, the job 50f is determined to be the erroneous job and the job 50h is determined to be the redo-job based on the difference in the error correction spot, which is pointed out from the ordering destination, through the comparison, which is performed by the image comparison unit 34, between the image data pertaining to the job 50e and the image data pertaining to the job 50f that is the identical scan job.

The human error determination unit 38 determines whether or not the human error occurs in the current job. It is considered that a process setting for the redo-job registered in the job history DB 24 is a correct setting (setting in which a result desired for the user may be acquired). In addition, for a plurality of identical or similar documents, it is conceivable that there are many cases in which the same process setting is the correct process setting. Therefore, in a case where the process setting for the current job is different from the process setting for the redo-job relevant to the past document which is identical or similar to the current document that is the target of the current job, there is a high possibility that the process setting for the current job is not the correct setting.

Therefore, the human error determination unit 38 first selects the job history, in which "redo" is registered as the human error information, from the job history registered in the registration job history DB 24. Furthermore, a redo-job relevant to the past document, which is identical or similar to the current document, is extracted from the selected redo-job. It is possible to determine the similarity between the current document and the past document using a method which is equivalent to the process of the comparison job specification unit 30. Meanwhile, the human error determination unit 38 may extract only the redo-job, which is input in the past by the user who inputs the current job, from the redo-jobs registered in the job history DB 24 based on the user ID of the user who inputs the current job and the user ID of each job history registered in the job history DB 24.

Subsequently, the human error determination unit 38 compares the process setting for the current job with a process setting for the extracted redo-job, and determines that the human error occurs in the current job in a case where the process setting for the current job is different from the process setting of the extracted redo-job.

For example, a case is considered where the content illustrated in FIG. 2 is registered in the job history DB 24 and the user inputs a current job relevant to a current document "Fuji white paper in 2018" and a current job which includes "both sides: unavailable" in the process setting. The human error determination unit 38 extracts the job 50b, which is a redo-job relevant to the past document "Fuji white paper in 2017" that is similar to the current document "Fuji white paper in 2018", from the job history DB 24. Furthermore, the process setting for the extracted redo-job is compared with the process setting for the current job. The process setting for the job 50b, which is the redo-job, indicates "both sides: available" and the process setting for the current job indicates "both sides: unavailable". Therefore, difference exists between both the process settings, and thus the human error determination unit 38 determines that the human error occurs in the current job.

In addition, there is a case where the user inputs a plurality of jobs according to a plurality of documents whose content are relevant. The plurality of documents whose content are relevant include, for example, an approval request written with a price used to acquire in-house settlement, and the order document based on the approval request. In this case, it is necessary that a price written in the approval request coincides with a price written in the order document. In a case where the price written in the order document is wrong with respect to the approval request, the human error occurs in the job relevant to the order document.

Therefore, the human error determination unit 38 compares content of a specific part, which is extracted from the image data pertaining to the current job, with content of a corresponding part corresponding to the specific part extracted from the image data pertaining to the past job for a relevant document which is previously determined with respect to the current document that is the target of the current job. In a case where difference exists between content of the specific part and the content of the corresponding part, it may be determined that the human error occurs in the current job.

An example of the approval request and the order document will be described. In a case where the user previously performs a job (for example, print or scan job) for the approval request, a job history for the approval request is registered in the job history DB 24. Subsequently, the user inputs a job for the order document as the current job. The human error determination unit 38 extracts the content of a price written area of the order document as the content of the specific part from the image data pertaining to the current job.

It is possible to specify the price written area from the image data pertaining to the current job by performing, for example, a process as below. First, preprocessing, such as inclination correction, is performed with respect to the image data. Subsequently, the image data is divided into a sentence area, a pattern area, such as a picture or a figure, and a ruled line area by performing an image interpretation process. Here, since the price written area is specified, the pattern area and the ruled line area are set to a background image. Text information is acquired by performing the OCR process with respect to the sentence area, and the price written area is specified based on the acquired text information.

Subsequently, the human error determination unit 38 extracts the past document relevant to the order document, which is the current document, from the job history DB 24. It is possible to perform the extraction process based on comparison between a file name of the current document and a file name of the past document. For example, a corresponding relationship between the "order document" and the "approval request" is previously registered, and the past document, which includes the "approval request" in a name, is extracted in a case where the "order document" is included in the current document. Furthermore, the human error determination unit 38 extracts content of the price written area of the approval request from the image data pertaining to a past job for the approval request which is the extracted past document. Furthermore, the human error determination unit 38 compares content of the price written area of the order document with the content of the price written area of the approval request, and determines that the human error occurs in the current job in a case where difference exists. The comparison may be performed between content of both the price written areas through image comparison, or the prices which are read by performing the OCR process may be compared.

Meanwhile, the user may be capable of setting whether or not to cause the human error determination unit 38 to determine the human error based on the difference between the current document and the relevant document. Otherwise, determination of the human error based on the difference between the current document and the relevant document may be performed only for an important document. For example, in a case where the file name of the current document includes a term "order", the human error may be determined based on the difference from the relevant document by determining the current document as the important document.

In addition, there is a case where, for at least a part of the document, content to be described is predetermined. For example, content supposed to be described in a date input field, in which a date of today is input in the document, is predetermined such that the date of today is input. It is apparent that there is a case where content to be described in, for example, an order date, a department name, an address, a telephone number, a name of a person in charge, or the like of a company are predetermined in addition to the date input field. For example, in a case where a document includes a date input field in which the date of today is input and the date of today written in the date input field is wrong, the human error occurs in a job relevant to the document.

Therefore, the human error determination unit 38 compares the content of the specific part extracted from the image data pertaining to the current job with content of the normal data which is previously prepared and which indicates content supposed to exist in the specific part. In a case where a difference exists between the content of the specific part and the content of the normal data, it may be determined that the human error occurs in the current job.

It is possible to store the normal data in a server or the storage unit 22 as, for example, a character string. For example, in a case where the normal data indicates the date of today, a character string which indicates the date of today is stored as the normal data. It is apparent that various normal data may be stored. The normal data, which is used for comparison, is appropriately selected according to the content of the specific part of the image data pertaining to the current job. Comparison with the content of the specific part and the content of the normal data may be performed through the image comparison, or the prices which are read by performing the OCR process may be compared.

An example of the date input field which indicates the date of today will be described. The human error determination unit 38 extracts content of the date input field as the content of the specific part from the image data pertaining to the current job. Subsequently, the human error determination unit 38 acquires the normal data, which indicates the date of today, from the server or the storage unit 22, compares the content of the date input field extracted from the image data pertaining to the current job with the content of the normal data, and determines that the human error occurs in the current job in a case where a difference exists.

Meanwhile, it is possible to perform setting of whether or not to cause the human error determination unit 38 to determine the human error based on the difference between the current document and the normal data by the user, and, in addition, the determination may be performed only for the important document.

In a case where it is determined by the human error determination unit 38 that the human error occurs in the current job, the warning output control unit 40 performs a process for outputting a warning with respect to the user who inputs the current job. Various aspects are considered as a warning aspect. For example, a warning message may be displayed on the display unit 20 or the user terminal used by the user. In addition to or instead of the warning message, the warning may be output through a warning sound or voice.

Content of the warning may be content according to content of determination performed by the human error determination unit 38. For example, in a case where the process setting for the current job is different from the process setting for the extracted redo-job, a warning relevant to an item, in which difference is recognized, may be provided among the process settings. For example, in a case where the process setting for the current job includes "both sides: unavailable" and the process setting for the redo-job includes "both sides: unavailable", a message "Will not perform printing on both sides?" is displayed as the warning message. In addition, in an example of the approval request and the order document, a message "Please check the price" is displayed as the warning message. In addition, in an example of the date input field, a message "Please check the date of today" is displayed as the warning message.

In addition, the warning output control unit 40 may output the warning to the user based on an input frequency of at least one of an erroneous job or a redo-job of the user who inputs the current job in the past based on the job history DB 24. Specifically, the warning output control unit 40 extracts the redo-job (or the erroneous job), which is input by the user who inputs the current job in the past, based on the user ID registered in the job history DB 24. Furthermore, in a case where the number of extracted redo-jobs (or the erroneous jobs) is equal to or larger than the threshold, the warning is output with respect to the user. Otherwise, in a case where the number of redo-jobs (or the erroneous jobs) within the past predetermined time from the current time is equal to or larger than the threshold, the warning may be output with respect to the user, thereby leading to demand for input of a correct job with respect to a user in which an input frequency of the erroneous job or the redo-job is high (that is, human error frequency is high).

Meanwhile, it may be possible to perform setting of whether or not to cause the warning output control unit 40 to output the warning by the user. For example, the warning function may be switched between ON/OFF in a setting menu of the information processing apparatus 10 in which it is possible for the user to perform setting.

The correction unit 42 performs a correction process relevant to the current job which is determined that the human error occurs by the human error determination unit 38. For example, in a case where the process setting for the current job is different from the process setting for the redo-job pertaining to the past document which is identical or similar to the current document that is the target of the current job, the correction unit 42 performs correction such that the process setting for the current job is identical to the process setting for the redo-job. The correction unit 42 may perform correction according to an instruction of the user (that is, manually by the user) or may automatically perform correction. It is preferable that, for example, the automatic correction performed by the correction unit 42 is performed after getting approval from the user.

In addition, in a case where the difference exists between the content of the specific part (for example, the date input field in which the date of today is input) extracted from the image data pertaining to the current job and content of the normal data (for example, the date of today) which indicates content supposed to exist at the specific part, the correction unit 42 may correct the image data pertaining to the current job such that the content of the specific part becomes the content of the normal data.

Meanwhile, it may be possible for the user to perform setting of whether or not to cause the correction unit 42 to perform the correction process relevant to the current job. For example, the correction function may be switched between ON/OFF in the setting menu of the information processing apparatus 10 in which it is possible for the user to perform setting. In addition, it may be possible for the user to perform setting of whether or not to cause the correction unit 42 to automatically perform the correction process relevant to the current job. For example, the automatic correction may be switched between ON/OFF in the setting menu of the information processing apparatus 10 in which it is possible for the user to perform setting.

The statistics generation unit 44 generates statistics relevant to occurrence of at least one of the erroneous job or the redo-job based on the job history DB 24. Hereinafter, although an example, in which the statistics generation unit 44 generates statistics relevant to occurrence of the redo-job, will be described, it is possible for the statistics generation unit 44 to generate statistics relevant to the occurrence of the erroneous job or statistics relevant to the occurrence of both the redo-job and the erroneous job through the same process.

The statistics indicate, for example, the number of times that the redo-job occurs. In addition, it is preferable that, for example, in the statistics, the number of times that the redo-job occurs is displayed for each fixed period (for example, each month). Furthermore, it is preferable that, for example, the number of times that the redo-job occurs is displayed for each job type or for each user. In addition, it is preferable that, for example, the statistics include the error cause, in which the redo-job occurs, the number of times that the error cause occurs.

FIG. 4 illustrates a first example of the statistics generated by the statistics generation unit 44. As illustrated in FIG. 4, the statistics may be displayed in a table format. In the example of FIG. 4, the number of times that the redo-job occurs is illustrated for each month. In addition, the number of times of redo-jobs is illustrated for each job type, and the number of times that an error cause in which the redo-job occurs is generated is illustrated. Meanwhile, it is possible to specify the error cause, in which the redo-job occurs, from the error information 24C (error cause) of the erroneous job in association with the redo-job in the job history DB 24.

In addition, in the statistics, the number of paper sheets which are unnecessarily consumed due to the input of the redo-job may be illustrated. In FIG. 4, the number of paper sheets is illustrated as "the number of wasteful output paper sheets". It is possible to totalize the number of wasteful output paper sheets based on the number of output paper sheets of the redo-job registered in the job history DB 24.

Figure 5:
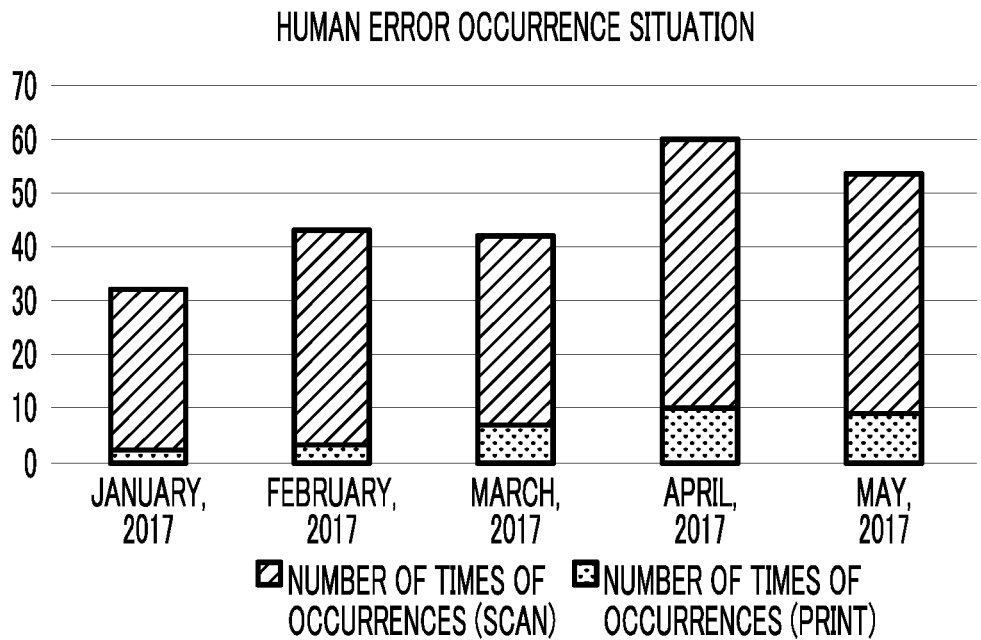
FIG. 5 is a diagram illustrating a second example of the statistical data.

In addition, the statistics may be generated in graph formats as illustrated in FIG. 5. In graphs of FIG. 5, the number of times that the redo-job occurs is illustrated as a bar graph for each month, and details are illustrated according to the job type.

Figure 6:
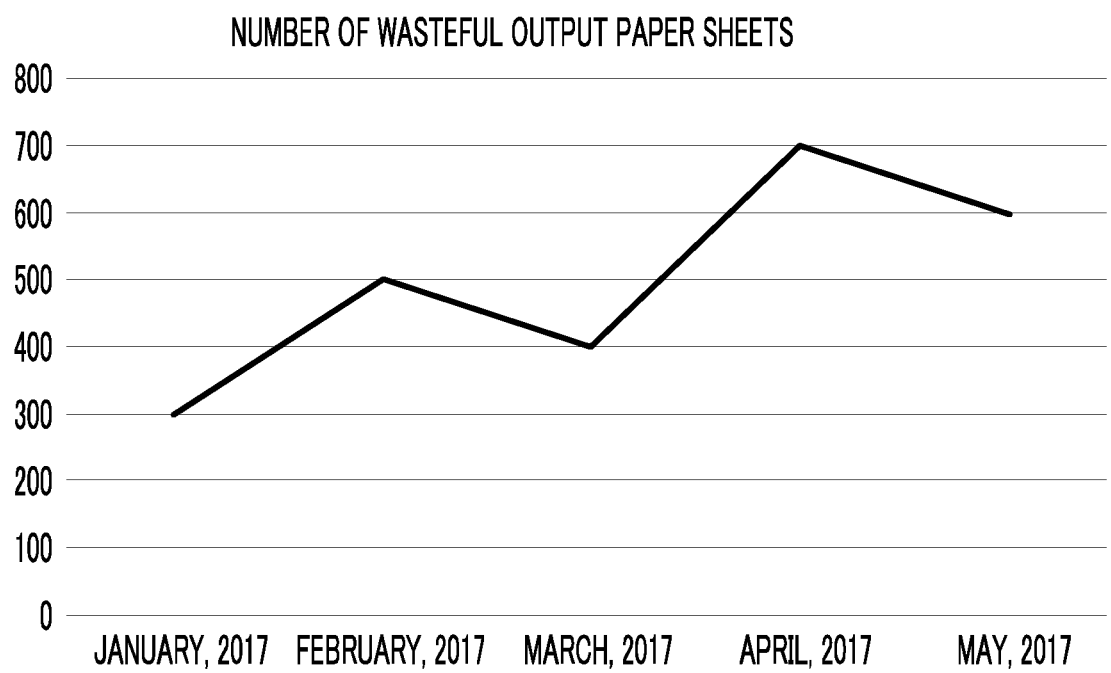
FIG. 6 is a diagram illustrating a third example of the statistical data.

In addition, as the statistics, a graph illustrating a change in time of the number of wasteful output paper sheets may be illustrated, as illustrated in FIG. 6. In an example of FIG. 6, a change in the number of wasteful output paper sheets for each month is illustrated using a polygonal line graph.

The display control unit 46 performs a process for displaying various screens on the display unit 20. In particular, the display control unit 46 displays the statistics generated by the statistics generation unit 44 on the display unit 20 or a display unit of the user terminal which accesses the information processing apparatus 10. In this manner, the display control unit 46 functions as a statistic output unit.

Hereinafter, a flow of a process of the information processing apparatus 10 will be described according to flowcharts illustrated in FIGS. 7 to 13.

Figure 7:
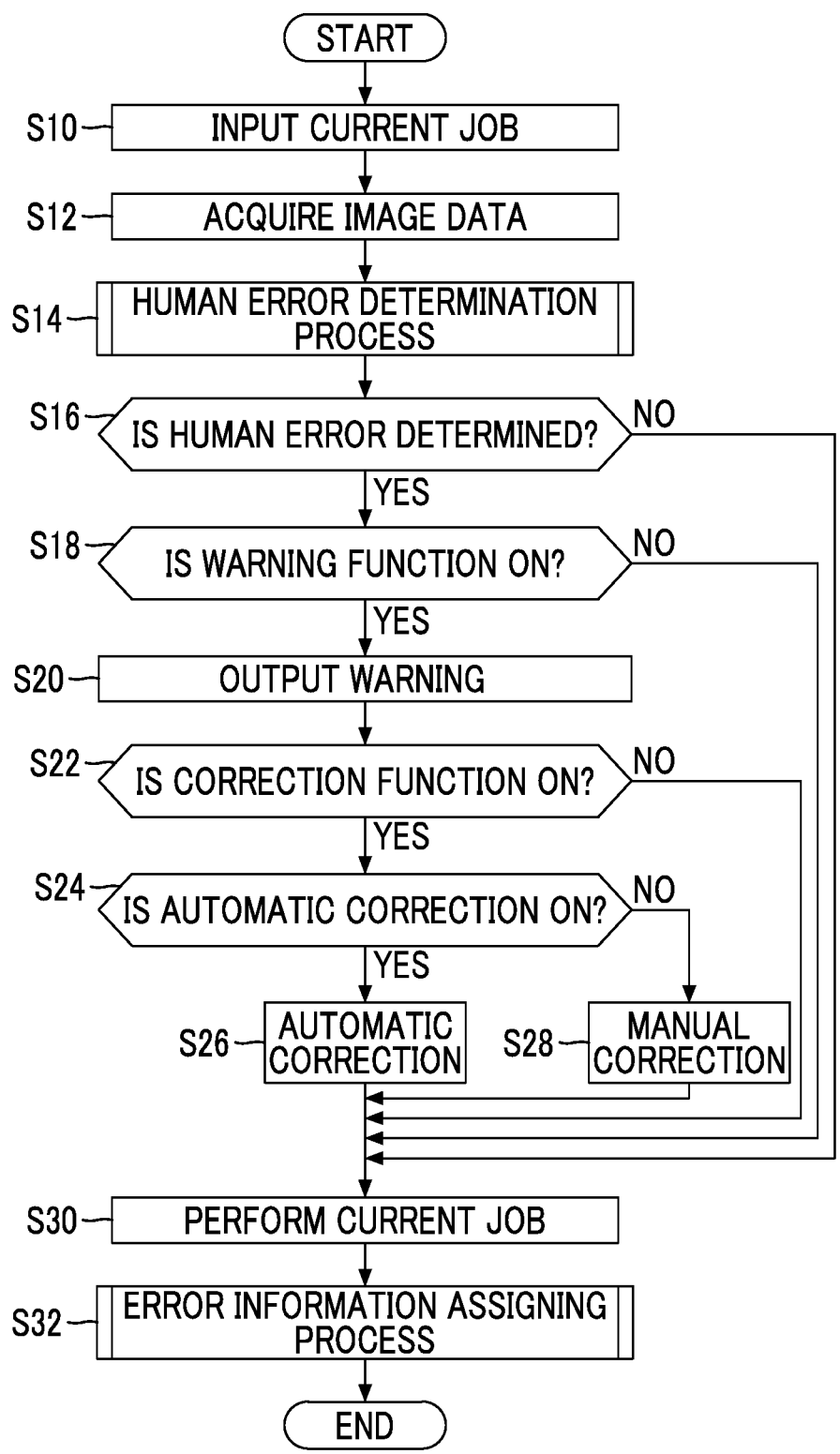
FIG. 7 is a flowchart illustrating a flow of a process performed by the information processing apparatus according to the exemplary embodiment.

FIG. 7 is a flowchart illustrating the flow of the whole process of the information processing apparatus 10 (particularly, the control unit 26).

In step S10, the user logs in the information processing apparatus 10, designates the process setting, and inputs the current job to the information processing apparatus 10.

In step S12, the information processing apparatus 10 acquires the image data pertaining to the current job.

In step S14, the human error determination unit 38 determines whether or not the human error occurs in the current job. Step S14 will be described in detail according to the flowcharts illustrated in FIGS. 10 to 12.

In step S16, the warning output control unit 40 determines whether or not it is determined that the human error occurs in the current job. In a case where it is determined that the human error occurs in the current job, the process proceeds to step S18. In a case where it is determined that the human error does not occur in the current job, the process proceeds to step S30.

In step S18, the warning output control unit 40 determines whether or not the warning function is ON. In a case where the warning function is ON, the process proceeds to step S20. In a case where the warning function is OFF, the process proceeds to step S30.

In step S20, the warning output control unit 40 outputs an warning with respect to the user who inputs the current job.

In step S22, the correction unit 42 determines whether or not the correction function is ON. In a case where the correction function is ON, the process proceeds to step S24. In a case where the correction function is OFF, the process proceeds to step S30.

In step S24, the correction unit 42 determines whether or not the automatic correction is ON. In a case where the automatic correction is ON, the process proceeds to step S26. In a case where the automatic correction is OFF, the process proceeds to step S28.

In step S26, the correction unit 42 automatically performs the correction process relevant to the current job. In step S28, the correction unit 42 performs the correction process relevant to the current job according to an instruction of the user.

In step S30, the information processing apparatus 10 performs a process relevant to the current job.

In step S32, the job history registration unit 28 registers the job history relevant to the current job in the job history DB 24. Specifically, the job history registration unit 28 determines whether or not the current job is a redo-job, and performs a process for registering the error information 24C in the job history DB 24 based on the determination. Step S32 will be described in detail according to flowcharts illustrated in FIGS. 8 and 9.

FIG. 8 is a first flowchart illustrating a detailed flow of an error information assigning process (step S32 of FIG. 7). The flowchart of FIG. 8 is a flowchart of a process for determining whether or not the current job is the redo-job based on a difference in the process settings between the current job and the past job relevant to the target document.

In step S40, the comparison job specification unit 30 searches the job history DB 24 for a target document which is the past document that is identical or similar to the current document which is the target of the current job.

In step S42, the comparison job specification unit 30 determines whether or not the target document exists in the job history DB 24. In a case where the target document exists, the process proceeds to step S44. In a case where the target document does not exist, the error information assigning process ends.

In step S44, the job setting comparison unit 32 compares the process setting for the current job with the process setting for the past job relevant to the target document.

In step S46, the job setting comparison unit 32 determines whether or not the process setting for the current job and the process setting for the past job relevant to the target document are different from each other. In a case where both the process settings are different from each other, the process proceeds to step S48. In a case where both the process settings are identical to each other, the error information assigning process ends.

In step S48, the error information registration unit 36 registers the error information 24C ("human error" in the human error information and "job parameter" in the error cause) with respect to the history of the past job relevant to the target document in the job history DB 24. In addition, the error information registration unit 36 registers the error information 24C ("redo" in the human error information) with respect to the history of the current job.

FIG. 9 is a second flowchart illustrating the detailed flow of the error information assigning process. The flowchart of FIG. 9 is a flowchart of a process for determining whether or not the current job is the redo-job based on a difference in the image data pertaining to the current job and the image data pertaining to the past job relevant to the target document.

In step S50, the comparison job specification unit 30 searches the job history DB 24 for target document which is the past document that is identical or similar to the current document which is the target of the current job.

In step S52, the comparison job specification unit 30 determines whether or not the target document exists in the job history DB 24. In a case where the target document exists, the process proceeds to step S54. In a case where the target document does not exist, the error information assigning process ends.

In step S54, the image comparison unit 34 compares the image data pertaining to the current job with the image data pertaining to the past job relevant to the target document.

In step S56, the job setting comparison unit 32 determines whether or not a difference exists between the image data pertaining to the current job and the image data pertaining to the past job relevant to the target document. In a case where the difference exists between both the image data, the process proceeds to step S58. In a case where the difference does not exist between both the image data, the error information assigning process ends.

In step S58, the error information registration unit 36 registers the error information 24C ("human error" in the human error information and "image data" in the error cause) with respect to the history of the past job relevant to the target document in the job history DB 24. In addition, the error information registration unit 36 registers the error information 24C ("redo" in the human error information) with respect to the history of the current job.

Figure 10:
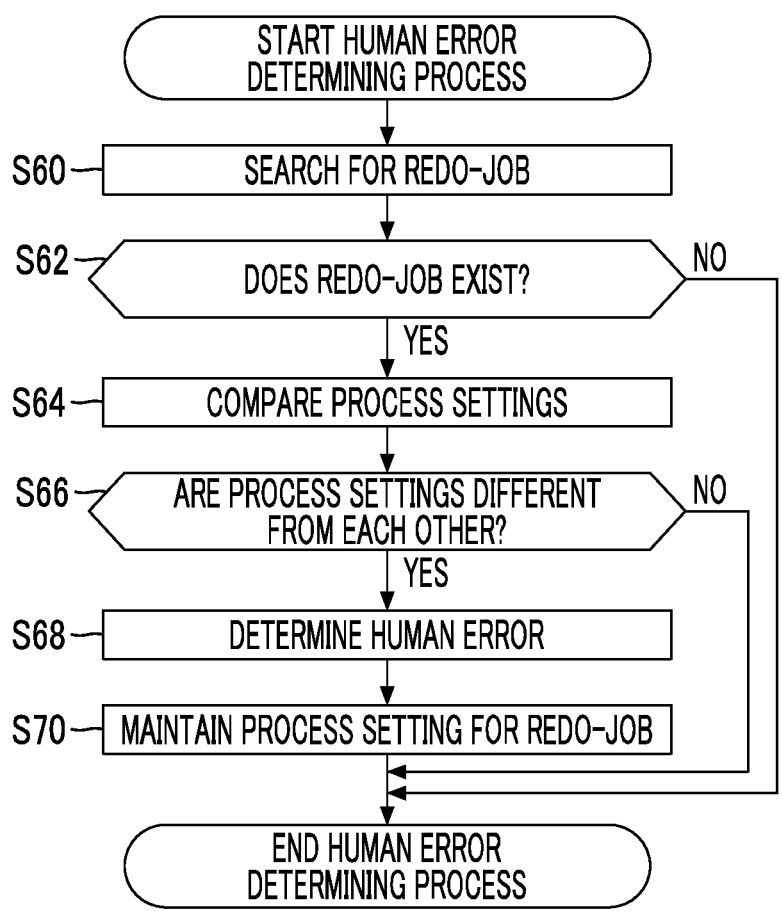
FIG. 10 is a first flowchart illustrating a flow of a human error determining process.

FIG. 10 is a first flowchart illustrating a detailed flow of a human error determining process. The flowchart of FIG. 10 is a flowchart of a process for determining whether or not the human error occurs in the current job based on difference between the process setting for the current job and the process setting for the redo-job pertaining to the past document which is identical or similar to the current document.

In step S60, the human error determination unit 38 searches the job history registered in the job history DB 24 for the redo-job in which "redo" is registered as the human error information and which pertains to the past document that is identical or similar to the current document.

In step S62, the human error determination unit 38 determines whether or not the redo-job exists in the job history DB 24. In a case where the redo-job exists, the process proceeds to step S64. In a case where the redo-job does not exist, it is determined that the human error does not occur in the current job, and thus the human error determining process ends.

In step S64, the human error determination unit 38 compares the process setting for the current job with the process setting for the redo-job which is extracted in step S62.

In step S66, the human error determination unit 38 determines whether or not the process setting for the current job is different from the process setting for the redo-job extracted in step S62. In a case where both the process settings are different from each other, the process proceeds to step S68. In a case where both the process settings are identical to each other, it is determined that the human error does not occur in the current job, and thus the human error determining process ends.

In step S68, the human error determination unit 38 determines that the human error occurs in the current job.

In step S70, the human error determination unit 38 maintains the process setting for the redo-job in the storage unit 22 in order to prepare for a subsequent warning process (step S20 of FIG. 7) or an automatic correction process (step S26 of FIG. 7).

FIG. 11 is a second flowchart illustrating a detailed flow of the human error determining process. The flowchart of FIG. 11 is a flowchart of the process for determining whether or not the human error occurs in the current job based on a difference between content of a specific part of the image data pertaining to the current job and the content of the corresponding part of the image data pertaining to the past job pertaining to a relevant document which is relevant to the current document.

In step S80, the human error determination unit 38 determines whether or not to perform comparison with the relevant document. For example, in a case where setting, in which comparison with the relevant document is performed, is performed by the user or in a case where the current document is an important document, the process proceeds to step S82. Otherwise, the human error determining process ends.

In step S82, the human error determination unit 38 searches the job history DB 24 for the relevant document.

In step S84, the human error determination unit 38 determines whether or not the relevant document exists in the job history DB 24. In a case where the relevant document exists, the process proceeds to step S86. In a case where the relevant document does not exist, the human error determining process ends.

In step S86, the human error determination unit 38 compares the content of the specific part of the image data pertaining to the current job with the content of the corresponding part of the past job image data pertaining to the relevant document extracted in step S84.

In step S88, the human error determination unit 38 determines whether or not a difference exists between the content of the specific part and the content of the corresponding part. In a case where the difference exists, the process proceeds to step S90. In a case where the difference does not exist, it is determined that the human error does not occur in the current job, and thus the human error determining process ends.

In step S90, the human error determination unit 38 determines that the human error occurs in the current job.

In step S92, the human error determination unit 38 maintains the content of the corresponding part in the storage unit 22 in order to prepare for the subsequent warning process or the automatic correction process.

FIG. 12 is a third flowchart illustrating the detailed flow of the human error determining process. The flowchart of FIG. 12 is a flowchart of a process for determining whether or not the human error occurs in the current job based on a difference between the content of the specific part of the image data pertaining to the current job and the content of content of the normal data.

In step S100, the human error determination unit 38 determines whether or not to perform comparison with the normal data. For example, in a case where setting, in which the comparison with the normal data is performed, is performed by the user or in a case where the current document is an important document, the process proceeds to step S102. Otherwise, the human error determining process ends.

In step S102, the human error determination unit 38 acquires the normal data from the server or the storage unit 22.

In step S104, the human error determination unit 38 compares the content of the specific part in the image data pertaining to the current job with the content of the normal data.

In step S106, the human error determination unit 38 determines whether or not the difference exists between the content of the specific part and the content of the normal data. In a case where the difference exists, the process proceeds to step S108. In a case where the difference does not exist, it is determined that the human error does not occur in the current job, and thus the human error determining process ends.

In step S108, the human error determination unit 38 determines that the human error occurs in the current job.

In step S110, the human error determination unit 38 maintains the content of the normal data in the storage unit 22 in order to prepare for the subsequent warning process or the automatic correction process.

FIG. 13 is flowchart illustrating a flow of a process for outputting a warning by the warning output control unit 40 based on a user's human error input frequency.

In step S120, the user logs in the information processing apparatus 10 and inputs the current job to the information processing apparatus 10.

In step S122, the warning output control unit 40 calculates the number of times of user's human errors in the past based on the user ID of the user who inputs the current job in step S120 and the user ID included in the job history registered in the job history DB 24. As described above, the warning output control unit 40 may calculate the number of times of human errors within the past predetermined time from current time.

In step S124, the warning output control unit 40 determines whether or not the number of times of human errors, which is calculated in step S122, is equal to or larger than the threshold. In a case where the number of times of human errors is equal to or larger than the threshold, the process proceeds to step S126. In a case where the number of times of human errors is smaller than the threshold, the process ends.

In step S126, the warning output control unit 40 determines whether the warning function is ON. In a case where the warning function is ON, the process proceeds to step S128. In a case where the warning function is OFF, the process ends.

In step S128, the warning output control unit 40 outputs the warning with respect to the user.

Hereinabove, the exemplary embodiment according to the present invention is described. However, the present invention is not limited to the exemplary embodiment, and various modifications are possible without departing from the gist of the present invention.

For example, in the exemplary embodiment, the information processing apparatus 10 is the MFP. However, for example, a personal computer may be used as the information processing apparatus according to the exemplary embodiment of the present invention. For example, it is possible to apply the present invention with respect to a process for opening the electronic document in the personal computer. An example of the process is described below.

Whenever the user opens the electronic document using a document application in the personal computer, job history, which includes a name of the electronic document, a user ID, and the like as the job attribute information 24A, may be registered in the job history DB 24.

Moreover, a case is considered where, although the user opens the electronic document (inputs the past job) in the personal computer, a version of the electronic document is old, and thus the user reopens an electronic document of the latest version (inputs the current job). In this case, the comparison job specification unit 30 specifies the old version electronic document (past electronic document), which is identical or similar to the latest version electronic document (current electronic document), and the past job pertaining to the past electronic document from the job history DB 24, the image comparison unit 34 determines that the past job is the erroneous job through comparison between the image data pertaining to the current job and the image data pertaining to the past job, and thus it is determined that the current job is the redo-job. Furthermore, the error information 24C is registered with respect to the current job and the past job by the error information registration unit 36.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a memory configured to store a process request history; and
    a processor, coupled to the memory, configured to:
    register at least one of information, which indicates that a current process request is a redo process request, or information, which indicates that a past process request pertaining to a target document is an erroneous process request, in the process request history stored in the memory in a case where a process setting for the past process request pertaining to the target document, which is a past document identical or similar to a current document that is a target of the current process request, included in the process request history including the process setting for the past process request and information which indicates the past document that is a target of the past process request, is different from a process setting for the current process request,
    wherein the processor determines the past document and the current document to be identical or similar based on a degree of similarity between file names of the past document and the current document.

2. An information processing apparatus comprising:
a memory configured to store a process request history; and
a processor, coupled to the memory, configured to:
register at least one of information, which indicates that a current process request is a redo process request, or information, which indicates that a past process request pertaining to a target document is an erroneous process request, in the process request history stored in the memory, in a case where a difference exists between image data pertaining to a past process request pertaining to the target document, which is a past document similar to a current document that is a target of the current process request, included in the process request history including a process setting for the past process request and information which indicates the past document that is a target of the past process request, and image data pertaining to the current process request,
wherein the processor determines the past document and the current document to be similar based on a degree of similarity between a pixel value for each pixel between the image data pertaining to the past process request and the image data pertaining to the current process request.

3. The information processing apparatus according to claim 1,
wherein the processor specifies the target document as the past document which is the target of the past process request whose process is completed within past predetermined time from current process request input time.

4. The information processing apparatus according to claim 2,
wherein the processor specifies the target document as the past document which is the target of the past process request whose process is completed within past predetermined time from current process request input time.

5. The information processing apparatus according to claim 1,
wherein the processor registers at least information, which indicates that the current process request is the redo process request, in the process request history, and
wherein the processor outputs a warning with respect to a user who inputs the current process request in a case where a process setting for the redo process request pertaining to the past document, which is identical or similar to the current document, included in the process request history, is different from the process setting for the current process request.

6. The information processing apparatus according to claim 2,
wherein the processor registers at least information, which indicates that the current process request is the redo process request, in the process request history, and
wherein the processor outputs a warning with respect to a user who inputs the current process request in a case where a process setting for the redo process request pertaining to the past document, which is identical or similar to the current document, included in the process request history, is different from the process setting for the current process request.

7. The information processing apparatus according to claim 3,
wherein the processor registers at least information, which indicates that the current process request is the redo process request, in the process request history, and
wherein the processor outputs a warning with respect to a user who inputs the current process request in a case where a process setting for the redo process request pertaining to the past document, which is identical or similar to the current document, included in the process request history, is different from the process setting for the current process request.

8. The information processing apparatus according to claim 4,
wherein the processor registers at least information, which indicates that the current process request is the redo process request, in the process request history, and
wherein the processor outputs a warning with respect to a user who inputs the current process request in a case where a process setting for the redo process request pertaining to the past document, which is identical or similar to the current document, included in the process request history, is different from the process setting for the current process request.

9. The information processing apparatus according to claim 5,
wherein the processor outputs the warning to the user in a case where a difference exists between content of a specific part, which is extracted from image data pertaining to the current process request, and content of a corresponding part corresponding to the specific part, which is extracted from image data pertaining to the past process request pertaining to a relevant document determined with respect to the current document.

10. The information processing apparatus according to claim 6,
wherein the processor outputs the warning to the user in a case where a difference exists between content of a specific part, which is extracted from image data pertaining to the current process request, and content of a corresponding part corresponding to the specific part, which is extracted from image data pertaining to the past process request pertaining to a relevant document determined with respect to the current document.

11. The information processing apparatus according to claim 7,
wherein the processor outputs the warning to the user in a case where a difference exists between content of a specific part, which is extracted from image data pertaining to the current process request, and content of a corresponding part corresponding to the specific part, which is extracted from image data pertaining to the past process request pertaining to a relevant document determined with respect to the current document.

12. The information processing apparatus according to claim 8,
wherein the processor outputs the warning to the user in a case where a difference exists between content of a specific part, which is extracted from image data pertaining to the current process request, and content of a corresponding part corresponding to the specific part, which is extracted from image data pertaining to the past process request pertaining to a relevant document determined with respect to the current document.

13. The information processing apparatus according to claim 5,
wherein the processor outputs the warning to the user in a case where a difference exists between the content of the specific part, which is extracted from the image data pertaining to the current process request, and content of normal data which is previously prepared and which indicates content supposed to exist in the specific part.

14. The information processing apparatus according to claim 6, wherein the processor outputs the warning to the user in a case where a difference exists between the content of the specific part, which is extracted from the image data pertaining to the current process request, and content of normal data which is previously prepared and which indicates content supposed to exist in the specific part.

15. The information processing apparatus according to claim 7,
wherein the processor outputs the warning to the user in a case where a difference exists between the content of the specific part, which is extracted from the image data pertaining to the current process request, and content of normal data which is previously prepared and which indicates content supposed to exist in the specific part.

16. The information processing apparatus according to claim 8,
wherein the processor outputs the warning to the user in a case where a difference exists between the content of the specific part, which is extracted from the image data pertaining to the current process request, and content of normal data which is previously prepared and which indicates content supposed to exist in the specific part.

17. The information processing apparatus according to claim 9,
wherein the processor outputs the warning to the user in a case where a difference exists between the content of the specific part, which is extracted from the image data pertaining to the current process request, and content of normal data which is previously prepared and which indicates content supposed to exist in the specific part.

18. The information processing apparatus according to claim 10,
wherein the processor outputs the warning to the user in a case where a difference exists between the content of the specific part, which is extracted from the image data pertaining to the current process request, and content of normal data which is previously prepared and which indicates content supposed to exist in the specific part.

19. The information processing apparatus according to claim 1,
wherein the processor outputs the warning to the user based on an input frequency of at least one of the erroneous process request or the redo process request for each user based on the process request history identified by the user who inputs the past process request.

20. The information processing apparatus according to claim 1,
wherein the processor outputs statistics which are generated based on the process request history and which are relevant to occurrence of at least one of the erroneous process request or the redo process request.

* * * * *